US012686643B2

(12) United States Patent (10) Patent No.: US 12,686,643 B2
Bartlett et al. (45) Date of Patent: Jul. 21, 2026

(54) THERMAL INSULATION MATERIALS SUITABLE FOR USE AT HIGH TEMPERATURES, AND PROCESS FOR MAKING SAID MATERIALS

(71) Applicant: MERSEN SCOTLAND HOLYTOWN LIMITED, Holytown (GB)

(72) Inventors: Ian Bartlett, Coatbridge (GB); Marcin Toda, Motherwell (GB)

(73) Assignee: MERSEN SCOTLAND HOLYTOWN LIMITED, Holytown (GB)

( * ) Notice: Subject to any disclaimer, the term of this patent is extended or adjusted under 35 U.S.C. 154(b) by 858 days.

(21) Appl. No.: 17/794,645

(22) PCT Filed: Jan. 21, 2021

(86) PCT No.: PCT/IB2021/050457
§ 371 (c)(1),
(2) Date: Jul. 22, 2022

(87) PCT Pub. No.: WO2021/148978
PCT Pub. Date: Jul. 29, 2021

(65) Prior Publication Data
US 2023/0142450 A1 May 11, 2023

(30) Foreign Application Priority Data
Jan. 22, 2020 (GB) ..................................... 2000898

(51) Int. Cl.
*C04B 35/626* (2006.01)
*C04B 35/83* (2006.01)

(52) U.S. Cl.
CPC ...... *C04B 35/6264* (2013.01); *C04B 35/6261* (2013.01); *C04B 35/83* (2013.01); *C04B 2235/424* (2013.01); *C04B 2235/5248* (2013.01); *C04B 2235/526* (2013.01); *C04B 2235/5264* (2013.01);
(Continued)

(58) Field of Classification Search
None
See application file for complete search history.

(56) References Cited

FOREIGN PATENT DOCUMENTS

RU        2535797 C1 * 12/2014
WO     WO-2004003279 A1 * 1/2004 ........... C04B 35/636

OTHER PUBLICATIONS

Machine English translation of RU2535797C1, Accessed Apr. 22, 2025 (Year: 2014).*

* cited by examiner

*Primary Examiner* — Abbas Rashid
*Assistant Examiner* — Adrianna N Konves
(74) *Attorney, Agent, or Firm* — Jordan IP Law, LLC; Todd A. Vaughn

(57) ABSTRACT

A process for making a thermal insulation material based on carbon and which includes carbon fibers, suitable for use at temperatures above 1,500° C. The process includes providing carbon fibers with embedded carbon black particles; cutting or milling said carbon fibers to obtain short carbon filaments; preparing a slurry by introducing the short carbon filaments in a liquid phase that includes a binder capable of forming a carbon residue upon pyrolysis under non-oxidizing conditions; casting the slurry into a mold capable of separating the slurry into a wet green body and a liquid phase; and drying and heat treating the wet green body to obtain a thermal insulation material.

11 Claims, 4 Drawing Sheets

(52) U.S. Cl.
CPC .. *C04B 2235/6027* (2013.01); *C04B 2235/94* (2013.01); *C04B 2235/9607* (2013.01)

THERMAL INSULATION MATERIALS SUITABLE FOR USE AT HIGH TEMPERATURES, AND PROCESS FOR MAKING SAID MATERIALS

CROSS-REFERENCE TO RELATED APPLICATION

The present application is a National Stage Application of PCT International Application No. PCT/IB2021/050457 (filed on Jan. 21, 2021), under 35 U.S.C. § 371, which claims priority to Great Britain Patent Application No. 2000898.3 (filed on Jan. 22, 2020), which are each hereby incorporated by reference in their complete respective entireties.

TECHNICAL FIELD

The invention relates to materials science, and more specifically to thermal insulation materials. It relates in particular to a process for making new thermal insulation materials using carbon fibers, which are suitable for use at temperatures above 1,500° C. and have a very low thermal conductivity. The invention also relates to said thermal insulation materials themselves.

BACKGROUND

Thermal insulation materials formed from carbon fibers are well known and widely used to provide thermal insulation in industrial systems working at high temperature, especially in systems working at a temperature above 1,000° C. (one thousand degrees Celsius). They owe their success to their unique stability in high temperature conditions in oxygen free atmosphere, to their low thermal conductivity, to their abundance and to their relatively cheap price.

Carbon fibers are known as such, and are produced in large quantities around the world. Their industrial production processes are widely documented (see for instance: "Carbon Fiber: manufacture and application" by Vincent Kelly, Elsevier Science and Technology, 2004). They are usually obtained by pyrolysis of an organic precursor fiber. Said precursor fibers can be derived from various natural sources, or they can be synthetic polymeric fibers. Typical natural precursor fibers are cotton fibers. Typical synthetic polymeric precursor fibers are Rayon, polyacrylonitrile (PAN), or like. Pitch can also be used as a precursor for carbon fibers. Polyethylene and polystyrene have been used, too (see WO 2017/167941 assigned to Total Research & Technology Feluy). The fiber production technique needs to be adapted to each type of precursor. Most of these processes include a step where a liquid precursor is transformed into a precursor fiber by techniques such as extrusion or melt spinning. Those precursor fibers will be then be transformed into carbon fibers by going through a more or less sophisticated pyrolysis (carbonization) treatment, consisting into heating the precursor fiber to at least 900° C. in an oxygen free atmosphere. Higher heat treatment temperatures are often required to produce carbon fibers with high mechanical properties; high mechanical properties at low density represent the most prominent features of carbon fibers and have triggered most of their industrial applications.

Commercially available thermal insulation materials formed from carbon fibers are of two types. One type can be described as "flexible" and consists of carbon fibers arranged together through common textile technologies (weaving, needling, carding, and felting). They are typically produced in continuous webs characterized by a certain thickness and a certain width. They are used generally by attaching them to a solid support, thereby determining a shape.

The other type can be described as "rigid" and consists of carbon fibers held together by means of a carbonaceous binder. These materials are manufactured as rigid or semi-rigid parts such as flat boards or cylinders that can form free-standing heat shields, and which can be machined.

The flexible types are characterized by an apparent density in the range of 0.05 to 0.15 g/cm$^3$, whereas the rigid types have a density in the range of 0.10 to 0.30 g/cm$^3$. Higher densities can be easily achieved but are rarely used as higher densities increase the thermal conductivity of the materials, which is detrimental to their intended use.

The primary function of thermal insulation materials is to prevent thermal losses in industrial processes or to protect certain structures or parts from intense heat. These are goals which will be better achieved with a material presenting intrinsically a low thermal conductivity. It is therefore desirable to further improve the thermal insulation performance of these materials, and indeed, these materials have been extensively studied in order to understand how their composition and production process conditions affect their thermal insulation properties, with the ultimate goal to develop solutions with superior insulation performances.

A technical report from Oak Ridge National Laboratory, published in 1973 ("Thermal Conductivity of Oriented Fibrous Carbon Insulation from 300 to 1300K in Nitrogen and Argon at one Atmosphere") by T. G. Godfrey and D. L. McElroy established two important relationships:

The thermal conductivity of the constituting carbon fiber and the thermal conductivity of the insulation material are linked by the following equation:

$$\lambda_m = 0.21(\lambda_1 v_1 + \lambda_2 v_2) + 0.79\left(\frac{\lambda_1 \lambda_2}{\lambda_1 v_1 + \lambda_2 v_2}\right), \tag{eq 1}$$

where $\lambda_m$ is the thermal conductivity of the insulation material at room temperature;

$\lambda_1$ and $v_1$ are, respectively, the thermal conductivity at room temperature and the fractional volume of fibers in the material; and $\lambda_2$ and $v_2$ are respectively the conductivity at room temperature and the fractional volume of the media (gas or vacuum) filling the voids between the fibers.

The material thermal conductivity $\lambda_m$ as established above depends on the temperature according to the following equation:

$$\lambda_m = a_0 + a_1\sqrt{T} + a_2T + a_3T^3 \tag{eq 2},$$

where T is the absolute temperature of the insulating material expressed in Kelvin.

Critically, this same study outlines that equation 2 above, established to describe the thermal conductivity of the insulation material as a function of temperature, is valid only for temperatures below 1,300K, a domain where the heat transfer mechanisms are dominated by the conduction of the constituting materials (as established in equation 1). Above this temperature, the contribution of the radiation becomes the predominant heat transfer mechanism. As a consequence, above 1,300K the thermal conductivity increases rapidly with the temperature of the material.

This drawback of thermal insulation materials made with fibers with low fiber volume fraction, when used at very high temperature, is well known to a person skilled in the art; it can be deduced from the technical literature and from all the available commercial literature advertising the thermal properties as a function of temperature of such materials.

In these high temperature ranges, the thermal conductivity is depending largely upon the ability of the material to prevent efficient radiation mechanisms; this property can be summarized as the "opacity" of the material. This characteristic, essential to a good thermal insulation performance at high temperatures (T>1,300 K), is not so much dependent on the intrinsic thermal conductivity of the fiber but more on their individual shape and spatial distribution. This can be seen from FIG. 1 showing the thermal conductivity as a function of temperature provided by Kureha for its flexible felt based on carbon fibers obtained from isotropic pitch; this flexible felt is sold under the trademark Kreca™ (see http://www.kurehacarbonproducts.com/kreca-fr.html). The figure shows the thermal conductivity of two felts having a density of 0.13 g/cm3 and 0.16 g/cm3.

Following the direction provided by equation 1, many carbon fiber based insulation materials have been developed using carbon fibers with the lowest possible thermal conductivity. As an example, U.S. Pat. No. 6,800,364 (assigned to UCAR Carbon Company Inc.) discloses a rigid insulating carbon material based on the carbon fibers made from isotropic pitch, deemed to offer a lower thermal conductivity than rayon based carbon fibers which are traditionally used.

RU 2,535,797 C1 describes the use of polyacrylonitrile (PAN) fibers that contain carbon black particles for making thermal insulation material. According to this patent, the addition of carbon black particles inside the PAN fibers results in low thermal conductivity fibers, favorable to the production of a high performance carbon fiber felt for thermal insulation purposes.

CN 106,245,226 A (Yu Muhuo and al.) discloses high performance thermal insulation felts based on carbon fibers produced from a melt of cellulose containing an addition of carbon black particles. According to this patent the carbon fibers produced by this method have a very low thermal conductivity, which is the consequence of the carbon black particles embedded into the carbon fibers; these carbon fibers are therefore suitable for the production of carbon fiber based felt with superior thermal insulation performances.

While all the inventions related above are pursuing the objective of producing a superior insulation material though the usage of low thermal conductivity carbon fibers, none of them addresses the specific issue of thermal insulation performance at temperature above 1,300K when radiation becomes the dominant heat transfer mechanism, and especially above 1,500° C.

The problem addressed by the present invention is to provide a novel thermal insulation material with improved thermal insulation properties, especially at high temperatures above about 1,000° C. and in particular above 1,500° C.

SUMMARY

According to the invention, the problem is solved by a process in which carbon fibers with embedded carbon black particles are linked together by a pyrolysable binder which will then be pyrolysed to form a carbon residue on the fibers. The inventors have observed that on carbon fibers with embedded carbon black particles the binder will spread over substantially all of the fiber surface and will not accumulate only on the contact points between two fibers. As a consequence, after pyrolysis the carbon fibers are covered by a layer of carbon residue which has the effect to reduce their thermal emissivity, thereby reducing radiative heat transfer between the fibers.

According to a first essential feature of the invention said carbon fibers must include carbon black particles. The mass fraction of said carbon black particles in said carbon fibers is preferably comprised between 1% and 50%, and more preferably comprised between 3% and 40%, and even more preferably comprised between 10% and 35%.

According to a second essential feature of the invention said carbon fibers must be short, in order to facilitate their coverage by the binder molecules and to avoid the accumulation of binder at the contact points. For short carbon fibers the carbon residue obtained after drying and pyrolysis of the binder will cover most of the fiber length and will not accumulate only on the contact points between two fibers. Moreover, short fibers will be less disordered that long fibers, thereby leading to a denser green body, which will lead, after appropriate heat treatment, to a rigid thermal insulation material that has a higher opacity at very high temperatures.

The process according to the invention will generally lead to a rigid or semi-rigid thermal insulation material which can be prepared as shaped parts, such as board, cylinders, or buckets. Said material can be machined.

The thermal opacity (i.e. the thermal insulation property) of this inventive material at very high temperatures, and in particular above 1,500° C. or 2,000° C., is better than what is generally feasible with carbon fiber-based felts or rigid boards according to prior art.

A first object of the invention is a process for making a thermal insulation material comprising carbon fibers, said process comprising the steps of Providing carbon fibers with embedded carbon black particles;

Cutting and/or milling said carbon fibers to obtain short carbon filaments with an average length not exceeding about 2,000 μm;

Preparing a slurry by introducing said short carbon filaments in a liquid phase comprising a binder capable of forming upon heat treatment at a temperature of at least 700° C. under non-oxidizing conditions a carbon residue representing 10% or more of the initial mass of the binder;

Casting said slurry into a mold capable of separating the slurry into a wet green body and a liquid phase;

Heat treating said wet green body in at least two steps, namely a drying step capable of drying and solidifying said binder, and a pyrolysis step carried out under non oxidizing conditions at a minimum temperature of 700° C., capable of transforming said binder into a carbon residue.

Advantageously, said carbon fibers have a mean diameter not exceeding 20 μm, preferably not exceeding 15 μm, and still more preferably have a mean diameter comprised between 1 μm and 10 μm.

Said liquid phase may comprise water.

During slurry casting, the mold is acting as a filter, retaining the wet carbon fibers.

Said binder should have a carbon yield of at least 10%, preferably of at least 20%, and still more preferably of at least 30%. Said binder may comprise an agent such as phenolic resin, sugar, and/or starch.

Said carbon fibers with embedded carbon particles can be obtained by a process comprising the following steps:

Providing polymeric, carbonisable fibers, so-called "precursor fibers", with embedded carbon black particles;

Submitting said precursor fibers to a first heat treatment at a temperature of at least 700° C., preferably of at least 800° C., and more preferably at least 900° C., to obtain carbon fibers containing embedded carbon black particles.

In an embodiment of said process for making a thermal insulation material comprising carbon fibers, said drying and heat treating step comprises a drying step capable of drying and solidifying said binder, and a pyrolysis step carried out under non oxidizing conditions at a minimum temperature of 700° C., capable of transforming said binder into a carbon residue. Said temperature is advantageously at least 800° C., and preferably at least 900° C.

Said pyrolysis step can be followed by a heat treatment at a temperature above 1,500° C., preferably above 1,800° C., and more preferably above 2,000° C., under non oxidizing conditions.

Said carbon filaments can have an average length comprise between about 100 μm and about 2,000 μm, and preferably comprised between about 200 μm and about 1,500 μm.

A second object of the present invention is a thermal insulation material obtainable from the process according to the present invention. In particular, said thermal insulation material can be manufactured as a rigid board or a rigid three-dimensional shape.

Said material according to the invention typically has a thermal conductivity at 1,000° C. that does not exceed 0.25 W/m·K, preferably does not exceed 0.23 W/m·K, and still more preferably does not exceed 0.20 W/m·K, and/or has a thermal conductivity at 1,700° C. that does not exceed 0.50 W/m·K, preferably does not exceed 0.45 W/m·K, and still more preferably does not exceed 0.40 W/m·K.

At third object of the present invention is a heat shield consisting of or comprising thermal insulation material according to the invention.

Yet another object of the present invention is the use of a thermal insulation material according to the invention, or of a heat shield according to the invention, at a temperature above 1,300° C., preferably above 1,500° C., more preferably at a temperature above 1,800° C., and in particular at temperature above 2,000° C.

In particular, said material or heat shield can be used with equipment for the manufacture of materials such as semiconductors, glasses, ceramics, and in particular with equipment for the manufacture of high-purity semiconductors, such as including crystal growing equipment.

DRAWINGS

FIG. 1 shows the thermal conductivity as a function of temperature for flexible felt products according to prior art. These products, based on carbon fibers obtained from isotropic pitch, are sold by the company Kureha under the trademark Kreca™; the figure is copied from their website (see http://www.kurehacarbonproducts.com/kreca-fr.html).

FIGS. 2 and 3 are schematic representations of carbon fibers with binder. FIG. 2 represents a case were the binder does not wet the carbon fiber but accumulates on the location where two or more carbon fibers are in contact. FIG. 3 shows a case where the binder wets the whole carbon fiber.

DESCRIPTION

Figure 1:
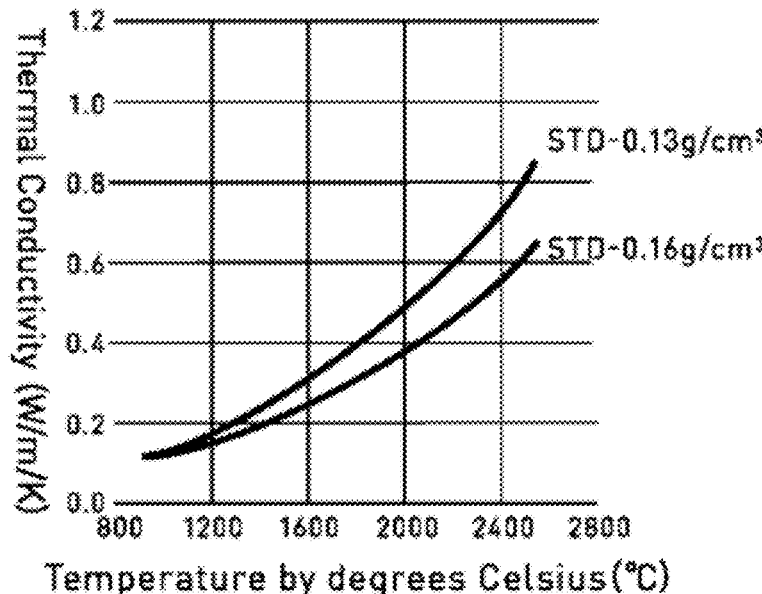

In a first step the raw materials are provided. The rare materials are carbon fibers and binder. According to an essential feature of the present invention, carbon fibers must be used as short filaments, with a length not exceeding about 2,000 μm and advantageously comprised between about 100 μm and about 2,000 μm, and preferably between about 200 μm and about 1,500 μm. The binder is a chemical compound which upon heat treatment up to 700° C. or more under non oxidizing atmosphere leaves a carbon residue which has at least 10% of the initial mass of the binder, and preferably at least 20%; this percent value is also known as the "carbon yield" of the binder under pyrolysis conditions. The binder is contained in a liquid phase, and can be used as a solution in an appropriate solvent, and/or in suspension, or as a slurry.

In this first step, either carbon fibers with embedded carbon black particles are provided directly as short carbon filaments with an average length not exceeding about 2,000 μm, or carbon fibers are provided and cut and/or milled down to an average length not exceeding about 2,000 μm.

In a second step, a slurry of said carbon fibers and said binder is prepared. Typically, the short carbon fibers are introduced in a liquid phase made from an appropriate liquid and a determined amount of binder dissolved or dispersed in said liquid. A thorough mixing and/or stirring of resulting liquid phase creates a slurry, composed of carbon fibers dispersed in said liquid phase.

In a third step, known as slurry casting, the slurry is poured into a mold made with a porous material, allowing the liquid to pass, but retaining the fibers. Leaving sufficient time, layers of fibers are deposited in the mold to form a so-called "wet green shape" or "wet green body", which is basically a wet mass of fibers with almost no cohesion.

The fourth step is a drying and solidification step. The wet green shape is dried so that the remaining liquid can be evaporated, but not the binder which precipitates ("settles") on the surface of the fibers. Once the drying is completed, the dried shape (called here "dried green shape" or "dried green body") is brought to a temperature high enough to create a physical and/or chemical transformation of the binder molecules which are transformed into a solid, cross-linked network, connecting the carbon fibers together. If the carbonizable binder is a thermosetting binder, such as a water-soluble phenolic resin, this transformation is typically carried out at a temperature in the order of 150° C. to 250° C., depending on the properties of the binder.

At this stage, the green body has turned into a solid, with a set structure in which the spatial arrangement of the fiber and the connecting binding network is established and cannot be changed. This solid body can be easily handled.

The fifth step is a high temperature thermal treatment. The solid obtained from drying and solidifying the green body is heat treated under non-oxidizing conditions to a temperature of at least 700° C., in order to transform the binding network resulting from the solidification step into a network made exclusively of carbon; during this transformation the solidified binder undergoes a pyrolysis.

The fourth and fifth step can be carried out as a continuous heating process or in two steps (one for drying and thermosetting, another for carbonization); the latter is preferred.

Depending on the intended use, the heat treatment can be pursued to temperatures up to 2,400° C. in order to promote a thermally stable structure for end users which are going to use the insulation material for very high temperature processes.

Considering the thermal opacity of the final heat insulation material, the spatial distribution of the fiber-binder network will be a determining factor. For instance, a process leading to dense clusters (local areas, characterized by a high fiber volume content) separated by low density areas will be less opaque than a product with a perfectly even distribution of the fibers; the former process will therefore be less favorable to the obtention of a heat insulation material with good thermal insulation performance than the latter.

The present inventors have found that said spatial distribution is determined by several factors among which: the binder-fiber interaction while the binder is still dissolved and/or suspended in the liquid phase, the viscosity of the slurry, the operating conditions of the slurry casting operation, and the drying conditions used for the green body.

Furthermore, the present inventors have found that when carbon fibers containing carbon black particles, such as the ones described in the patent CN 106,245,226, are used with a binder, these fibers promote a drastically different fiber-binder interaction, while the binder is still dissolved and/or suspended in the liquid phase, from what is commonly observed with fibers that do not contain carbon black. This difference can be detected for instance by measuring the wetting angle between the fiber and the solvent+binder solution. This different interaction promotes in turn a different behavior of the slurry during the slurry casting operation. Clusters of fibers are almost entirely avoided and the consistency of the wet green body much improved, with less variations between the fiber volume fraction between the bottom layers and the bottom layers of the wet green body for instance.

It has also been observed that during the drying step following the casting, when the binder molecules are forced to precipitate on the fiber surface, there is less coagulation of the binder residue; coagulation of the binder is commonly observed when the binder has a limited affinity with the surface of the fiber. While the inventors do not wish to be bound by this theory, they believe that this phenomenon and its negative consequences on the thermal insulation performance can be better understood through the schematic representations on FIG. 2.

Figure 2:
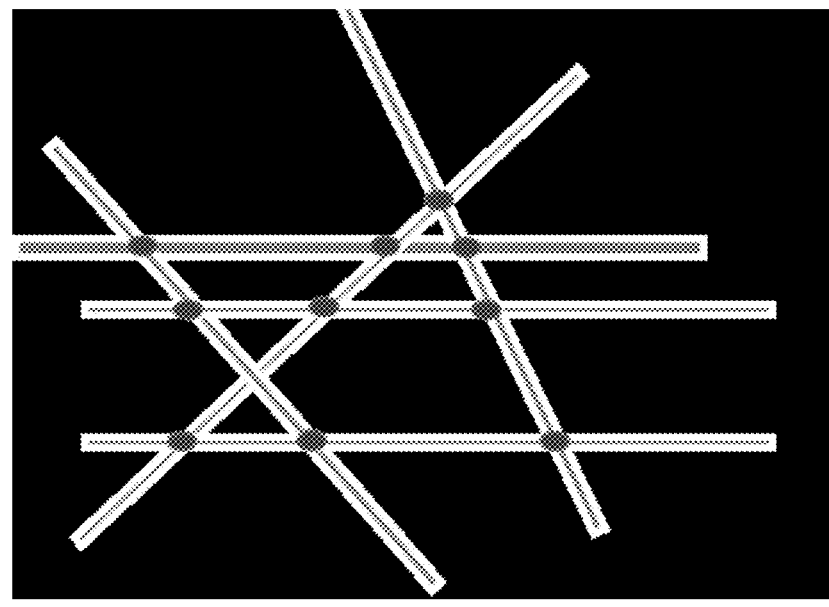

FIG. 2 schematically how a wet green body made with carbon fibers having a poor wettability for binder. During the drying step of the wet green body as the concentration of the binder increases due to solvent evaporation, a poor wetting of the fiber by the binder molecule will promote the regrouping and accumulation of binder molecules on the locations where two or more carbon fibers are in contact, which is the most favorable mechanism to minimize the total energy of the system. The coagulation of the binder at the intersection of carbon fibers provides, once the heat treatment is completed, larger bridges between the fibers, promoting a better thermal communication from one fiber to another, thereby increasing thermal conductivity. This is detrimental to the thermal insulation performance of the resulting body.

Figure 3:
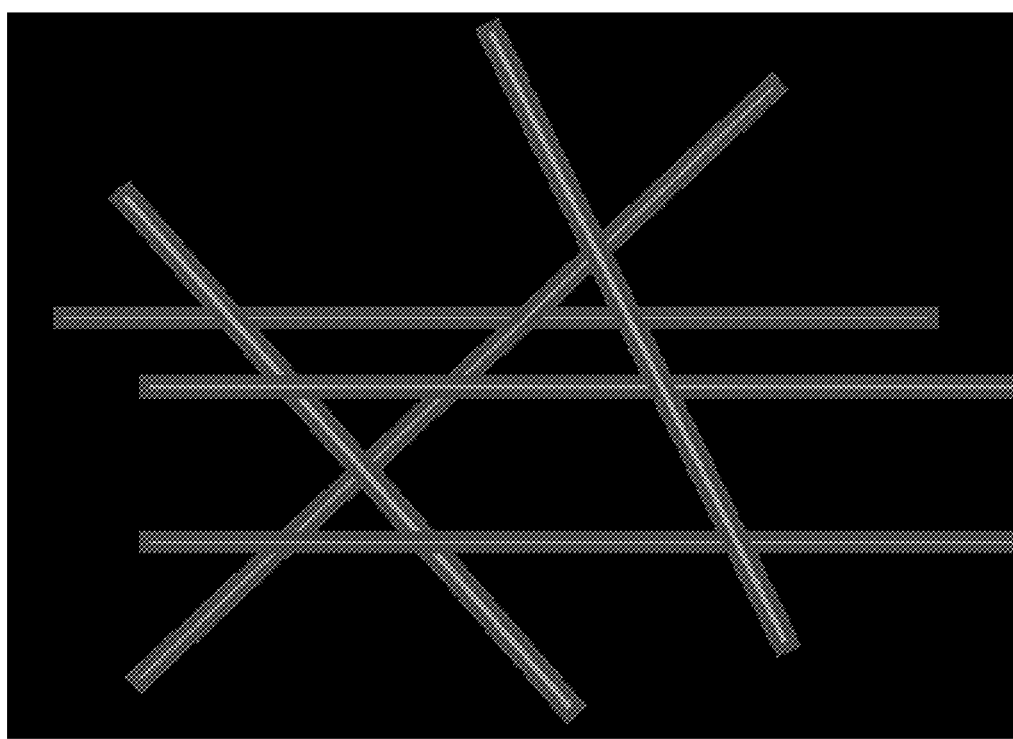

FIG. 3 schematically shows a wet green body made with carbon fibers having a good wettability for binder. During the drying step of the wet green body as the concentration of the binder increases due to solvent evaporation, a good wetting of the fiber by the binder molecule will promote the distribution of the binder molecules over the entire surface of the fibers.

As mentioned above, according to a second essential feature of the present invention, the carbon fibers used in the present invention must contain carbon black particles. Carbon black as such is known to a person skilled in the art, and its origin, morphology and structure will not be explained here further, except to recall that carbon black is an industrial product composed of carbon particles which are nano-sized particles with a diameter range of about 10 nm to a few hundreds of nanometres. In the framework of the present invention, a mean size comprised between about 10 nm and about 100 nm is preferred, and still more preferred is a mean size of between about 20 nm and about 70 nm.

Such carbon black nanoparticles can be incorporated into polymer fibers which are precursors for carbon fibers. Such precursor fibers can be Rayon fibers, for example. More precisely, the carbon black particles are incorporated into the liquid mass from which polymer fibers are produced; these polymer fibers are then pyrolyzed into carbon fibers. During pyrolysis, the carbon black particles remain virtually unchanged. The resulting carbon fibers therefore comprise nanosize carbon black particles. These carbon fibers can be used in the process according to the present invention.

The thermal insulation material obtainable from the process according to the invention are typically rigid materials. They can have the form of board or plate, or can be of three-dimensional shape. Three dimensional shapes can be obtained at the green body stage. Such three-dimensional shapes can be plates, curved plates, hollow shapes, tubular shapes and so on, as may be needed. More generally, the thermal insulation material according to the invention can be used for the manufacture of heat shields, which can consist in said thermal insulation material according to the invention, or which can comprise said thermal insulation material according to the invention.

Figure 6:
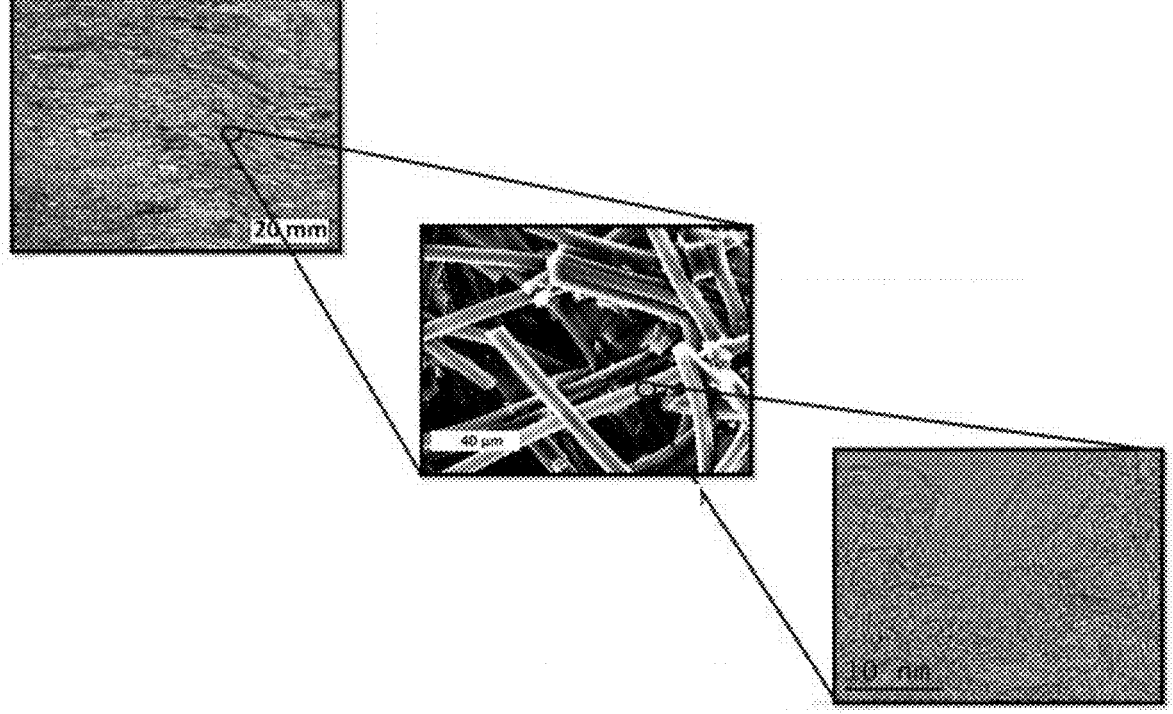
FIG. 6 shows three scanning electron micrographs of a thermal insulation material according to the invention at three different magnification levels.

FIG. 6 shows a typical microstructure of a typical thermal insulation material according to the invention. The figure in the left shows the general morphology of the material; the length of the white bar is 20 mm. The figure in the center shows the mesoscopic scale, the length of the white bar being 40 μm. The individual carbon fibers can be distinguished, as well as the void between adjacent fibers. The figure on the right shows the nanoscopic structure inside the carbon fiber, the length of the black bar being 10 nm.

The thermal insulation material according to the invention are useful at any temperature, but are particularly useful when used at a temperature above 1,800° C., and in particular at temperature above 2,000° C., and possibly even as high as 2,300° C., in non-oxidizing atmosphere. Due to the very weak outgassing of the thermal insulation material, in particular when said third heat treatment step has been carried out, an advantageous use is a use with equipment for the manufacture of high-purity materials such as semiconductors, glasses, ceramic. Said manufacturing processes for high-purity semiconductors include crystal growing.

The thermal insulation material according to the invention is made entirely from carbonaceous materials and has preferably been heat treated at high temperature (preferably at least 1,500° C.). This avoids the contamination with hetero atoms (such as oxygen or nitrogen) of goods processed in said equipment for the manufacture of materials in which said thermal insulation material is eventually used. Absence of contamination with hetero atoms is particularly important for high purity materials such as semiconductors, ceramics and glasses for specific applications in which the presence of impurities causes specific, unwanted physical or chemical effects. In the case of semiconductors, these effects can be related to doping; in the case of glasses they can be related to optical absorption.

In a particularly advantageous embodiment of the invention, said thermal insulation material has a thermal conductivity at 1,000° C. that does not exceed 0.25 W/m·K, preferably does not exceed 0.23 W/m·K, and still more preferably does not exceed 0.20 W/m·K, and/or said thermal insulation material has a thermal conductivity at 1,700° C. that does not exceed 0.50 W/m·K, preferably does not exceed 0.45 W/m·K, and still more preferably does not exceed 0.40 W/m·K. Such a thermal insulation material is particularly useful for a use with equipment for the manufacture of high purity materials, as mentioned above, in particular for making high purity semiconductors; it can be used for example with crystal growing equipment.

The use of the thermal insulation material according to the invention in oxidizing atmosphere is possible, too, but not recommended above 350° C.

Examples

In a first series of experiments, four samples labelled (a), (b), (c) and (d) were produced, as follows:

Sample (a): Carbon felt according to the state of the art

Carbon fibers ex-Rayon were cut to 60 mm average length, needled into a felt 11 mm thick, and heat-treated in a non-oxidizing atmosphere up to 2,300° C. The result is a graphitized carbon fiber felt, with a thickness of 10 mm and an apparent density of 0.09 gr/cc.

Sample (b): Rigid insulation board outside of the invention

Carbon fibers ex-Rayon were cut at a 700 μm average length, processed in a phenolic resin/water solution (12% (w/w) of phenolic resin in water 88% (w/w)), cast, dried, solidified, and heat treated at 2,300° C. The final product has an apparent density of 0.16 gr/cc.

Sample (c): Carbon felt outside of the invention

Same as sample (a) but for the fact that the Rayon fibers are containing 5% (w/w) of carbon black particles added into the Rayon melt prior to the spinning (extrusion) of the Rayon fibers. The final carbon felt product has a thickness of 10 mm and an apparent density of 0.09 gr/cc.

Sample (d): Rigid insulation board according to the invention

The process is the same as for sample (b) except that the ex-Rayon carbon fibers have been replaced by carbon fibers obtained from Rayon fibers produced from a Rayon melt containing 5% (w/w) of carbon black particles. The final product has an apparent density of 0.14 gr/cc.

Figure 4:
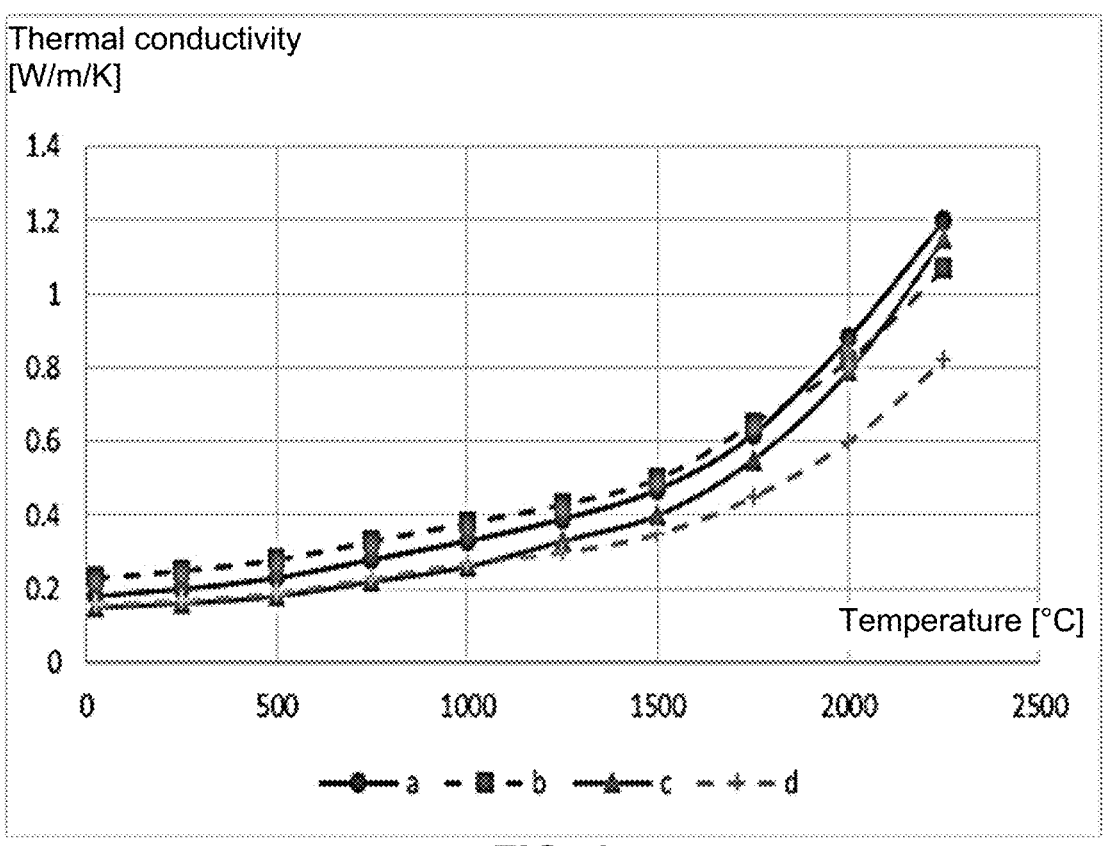
FIG. 4 shows the thermal conductivity as a function of temperature for four thermal insulation materials as explained in the section "Examples". Samples (a), (b), and (c) are either prior art or outside of the scope of the present invention, while sample (d) represents the invention.

As can be seen from FIG. 4 the material of the invention (d) exhibits a favorable thermal insulation performance at both ends of the temperature range.

The result on the low temperature range (from room temperature up to 1,000° C.) was expected as a result of the low thermal conductivity of the carbon fibers with the added carbon black particles, as claimed by the patent documents RU 2,535,797 and CN 106,245,226 mentioned above, and of the lower density (compared to classic rigid board) made possible by the better wetting of the carbon fiber.

The result on the high temperature range is unexpected, and is the consequence of the invention, which promotes a structure which has a higher thermal opacity and a much improved thermal insulation performance which is detectable at temperatures of the order of 1,700° C. and above.

In a second series of experiments, three other samples of rigid thermal insulation board according to the invention, labelled (e), (f), and (g), were produced, as follows. All of them were based on carbon fibers manufactured from Rayon fibers containing carbon black particles.

Sample (e): Same as sample (d), wherein the phenolic resin 12%/water 88% solution has been replaced by a sugar 45%/water 55% solution to serve as a binder.

Sample (f): Same as sample (d), where the carbon black content in the rayon fibers is 3.5% (w/w) instead of 5% (w/w).

Sample (g): Same as sample (d), where the carbon black content in the rayon fibers is 10% (w/w) instead of 5% (w/w).

Figure 5:
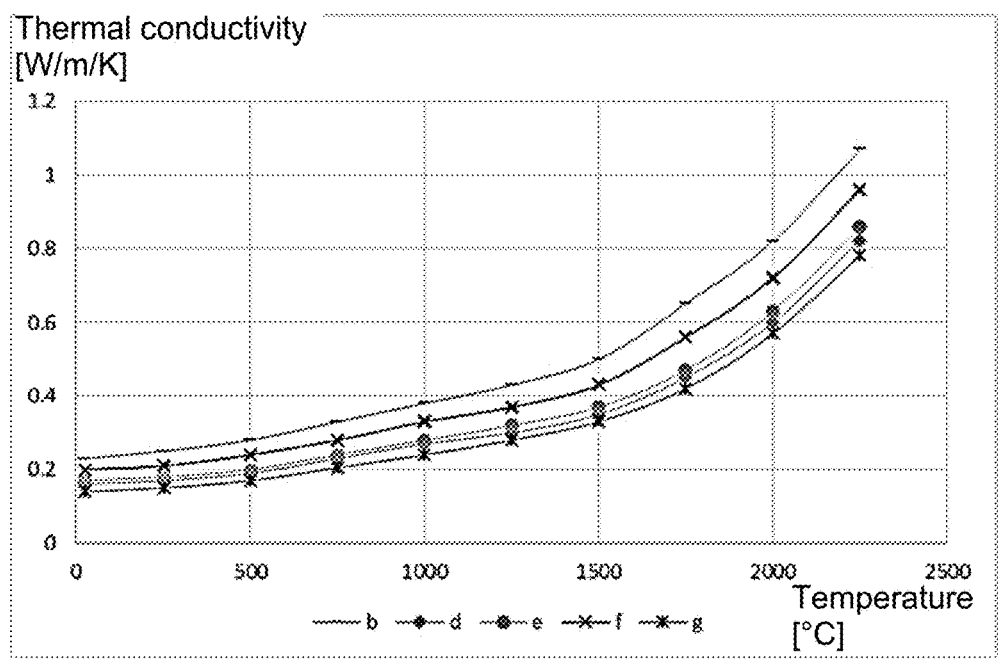
FIG. 5 shows a curve similar to FIG. 4. Samples (d), (e), (f), and (g) are according to the invention, while sample (b) is outside of the scope of the invention.

The results are shown on FIG. 5, which also compares these results with those obtained for rigid thermal insulation board obtained from the first series of experiments (samples (b) and (d)).

Table 1 summarizes all the samples that have been elaborated as examples.

TABLE 1

| Sample | Process | Comment |
|---|---|---|
| (a) | Ex Rayon carbon fiber, long fiber, felt structure | Prior art |
| (b) | Ex Rayon carbon fiber, short fiber + phenolic binder | Outside of the invention |
| (c) | Ex Rayon carbon fiber + carbon black, felt structure | Outside of the invention |
| (d) | Ex Rayon carbon fiber + carbon black particles (5%), short fiber + phenolic binder | According to the invention |
| (e) | Ex Rayon carbon fiber + carbon black particles (5%), short fiber + "sugar binder" | According to the invention |
| (f) | Ex Rayon carbon fiber + carbon black particles (3.5%), short fiber + phenolic binder | According to the invention |
| (g) | Ex Rayon carbon fiber + carbon black particles (10%), short fiber + phenolic binder | According to the invention |

In another series of experiments, the zeta potential of two types of fibers was measured using a Malvern Zetasizer™ in a slurry prepared with pure water as the liquid phase; the electrical conductivity of the slurries was 0.05 mS/cm.

Fiber 1 contains no carbon black particles; this is a fiber as used in a prior art processes.

Fiber 2 contains carbon black particles; this is a fiber as used in a process according to the present invention.

Figure 7:
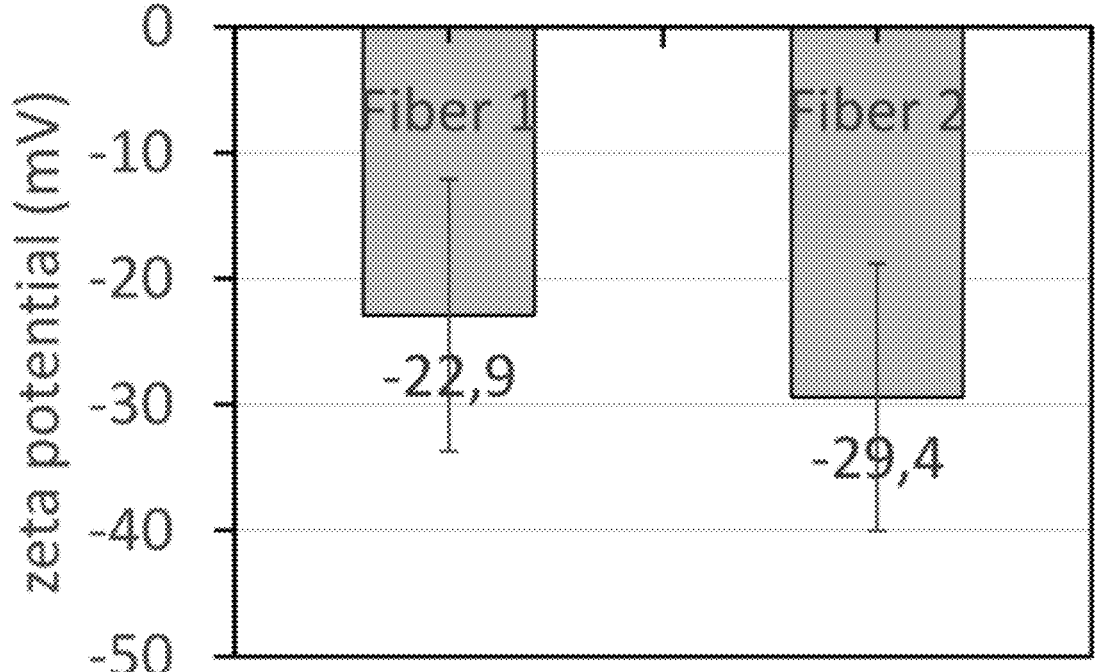
FIG. 7 shows measured values for the zeta-potential of two types of fibers, namely fiber 1 according to prior art, and fiber 2 according to the invention.

The result is shown on FIG. 7. It can be seen that both fibers are negatively charged. The zeta potential of fibers containing carbon black particles is more negative (i.e. is negative and has a higher absolute value) than that of fibers containing no carbon black particles.

The zeta potential measurement is rather approximate and depends on the ionic strength of the medium. The addition of salts will cause a slight reduction of the absolute value of the zeta potential.

This result comes in support of the observation that the fibers containing carbon black particles are easier to disperse in the water-borne slurry than fibers containing no carbon black particles. The lower zeta potential tends to favor a better distribution and orientation of the fibers in the thermal insulation material.

What is claimed is:

1. A process for making a thermal insulation material comprising carbon fibers, the process comprising:

providing carbon fibers with embedded carbon black particles;

cutting or milling the carbon fibers with the embedded carbon black particles to obtain short carbon filaments with an average length not exceeding about 2,000 μm;

preparing a slurry by introducing the short carbon filaments in a liquid phase having a pyrolysable binder dissolved or dispersed therein such that the pyrolysable binder is distributed over substantially all surfaces of the short carbon filaments and does not accumulate only on contact points of the short carbon filaments;

casting said slurry into a mold composed of a porous material to deposit the short carbon filaments in the mold and thereby form a wet green body; and drying the green body and then heat treating the wet green body under non-oxidizing conditions to obtain the thermal insulation material.

2. The process of claim 1, wherein said drying and heat treating comprises drying and solidifying the pyrolysable binder, and then conducting pyrolysis under non-oxidizing conditions at a minimum temperature of 700° C. to transform the pyrolysable binder into a carbon residue.

3. The process of claim 2, wherein conducting the pyrolysis is carried out at a temperature of at least 900° C.

4. The process of claim 3, further comprising, after conducting the pyrolysis, conducting a further heat treatment of the wet green body at a temperature above 2,000° C. under non-oxidizing conditions.

5. The process of claim 1, wherein the short carbon filaments have an average length of between about 200 μm and about 1500 μm.

6. The process of claim 1, wherein a carbon yield of the pyrolysable binder is at least 20%.

7. The process of claim 1, wherein the mass fraction of the carbon black particles in the carbon fibers is between 10% and 35%.

8. The process of claim 1, wherein the pyrolysable binder comprises an agent selected from the group consisting of phenolic resin, sugar, and starch.

9. The process of claim 1, wherein the liquid phase comprises water.

10. The process of claim 1, wherein the carbon fibers have a mean diameter not exceeding 15 μm.

11. The process of claim 1, wherein the carbon fibers have a mean diameter of between 1 μm and 10 μm.

* * * * *